United States Patent
Bentner et al.

(10) Patent No.: US 8,532,902 B2
(45) Date of Patent: Sep. 10, 2013

(54) METHOD FOR CONTROLLING AT LEAST ONE ELECTROMECHANICAL PARKING BRAKE UNIT OF AN ELECTROMECHANICAL PARKING BRAKE SYSTEM

(75) Inventors: Johannes Bentner, Pentling (DE); Alexander Kalbeck, Burglengenfeld (DE)

(73) Assignee: Continental Automotive GmbH, Hannover (DE)

( * ) Notice: Subject to any disclaimer, the term of this patent is extended or adjusted under 35 U.S.C. 154(b) by 236 days.

(21) Appl. No.: 12/744,369

(22) PCT Filed: Nov. 11, 2008

(86) PCT No.: PCT/EP2008/065315
§ 371 (c)(1),
(2), (4) Date: Jun. 30, 2010

(87) PCT Pub. No.: WO2009/065754
PCT Pub. Date: May 28, 2009

(65) Prior Publication Data
US 2010/0262330 A1   Oct. 14, 2010

(30) Foreign Application Priority Data
Nov. 23, 2007 (DE) .................. 10 2007 056 417

(51) Int. Cl.
*B60T 7/12* (2006.01)

(52) U.S. Cl.
USPC ............................. 701/76; 701/29.2

(58) Field of Classification Search
USPC .............. 701/70, 76, 92, 29.2; 303/3, 20
See application file for complete search history.

(56) References Cited

U.S. PATENT DOCUMENTS

| 6,749,269 | B1 | 6/2004 | Niwa | 303/20 |
|---|---|---|---|---|
| 7,341,319 | B2 | 3/2008 | Klusemann et al. | 303/20 |
| 2003/0067219 | A1* | 4/2003 | Seto et al. | 303/193 |
| 2004/0055832 | A1 | 3/2004 | Mercer | 188/2 D |
| 2006/0225972 | A1* | 10/2006 | Klusemann et al. | 188/158 |
| 2007/0131468 | A1* | 6/2007 | Bullinger et al. | 180/282 |

FOREIGN PATENT DOCUMENTS

| DE | 19834129 C1 | 4/2000 |
|---|---|---|
| DE | 10351589 A1 | 6/2005 |
| EP | 1026060 | 8/2000 |
| EP | 1172272 | 1/2002 |
| WO | 2006010735 | 2/2006 |

OTHER PUBLICATIONS

International Search Report and Written Opinion for Application No. PCT/EP2008/065315 (12 pages), Jun. 5, 2009.
International PCT Search Report and Written Opinion, PCT/EP2008/065315, 12 pages, Jun. 5, 2009.

* cited by examiner

*Primary Examiner* — Michael McCullough
(74) *Attorney, Agent, or Firm* — King & Spalding L.L.P.

(57) ABSTRACT

In a method for controlling at least one electromechanical parking brake unit in a vehicle, the current vehicle speed is detected by a speed sensor system in the form of a speed measuring signal, and a deceleration measuring signal displaying the current vehicle deceleration is detected by at least one acceleration sensor system. In the event of a defective speed signal or a failure of the speed sensor system, the electromechanical parking brake system is operated in an emergency operation mode wherein, at the beginning of a braking, a dynamic braking function is provided by the electromechanical parking brake unit. Advantageously, the current vehicle deceleration is determined from the deceleration measuring signal and compared with a pre-determined minimum deceleration value, and if the determined current vehicle deceleration falls short of the pre-determined value in the emergency operation mode, a static brake function is provided by the electromechanical parking brake unit.

20 Claims, 3 Drawing Sheets

ମETHOD FOR CONTROLLING AT LEAST ONE ELECTROMECHANICAL PARKING BRAKE UNIT OF AN ELECTROMECHANICAL PARKING BRAKE SYSTEM

CROSS-REFERENCE TO RELATED APPLICATIONS

This application is a U.S. National Stage application of International Application No. PCT/EP2008/065315 filed Nov. 11, 2008, which designates the United States of America, and claims priority to German Application No. 10 2007 056 417.3 filed Nov. 23, 2007, the contents of which are hereby incorporated by reference in their entirety.

TECHNICAL FIELD

The invention relates to a method for controlling at least one electromechanical parking brake unit of an electromechanical parking brake system.

BACKGROUND

Electromechanical parking brake systems are adequately known from the prior art. Electromechanical parking brake systems of this type on the one hand ensure a static braking of the vehicle for safe stoppage of said vehicle when stationary and on the other hand ensure a dynamic braking of the vehicle. Both braking functions are provided by an electromechanical parking brake unit which is controlled by way of a control device.

A manual actuation of a control element provided in the vehicle interior preferably triggers a switching element provided in the vehicle interior. By actuating the switching element, at least one electronic control signal is generated, which is supplied to the control device for evaluation purposes. A control and evaluation routine embodied in the control device controls the electromechanical parking brake unit, i.e. activates or releases it for instance.

The decision as to which of the cited braking functions is implemented by the electromechanical parking brake when an electronic control signal of this type is present, i.e. static braking or dynamic braking, is made by means of the control and evaluation routine, namely as a function of the vehicle speed currently prevailing, which is determined by way of a speed sensor system provided in the vehicle.

In practice, the determination of the vehicle speed is however prone to faults or there is a failure of the speed sensor system, as a result of which a defective control of the electromechanical parking brake unit can be produced. Within the scope of the control of the electromechanical parking brake unit, it must be ensured that the electromechanical parking brake unit provides the static brake function in the event of a manual actuation of the control element only when the vehicle is stationary. A triggering of the static brake function while moving would result in a blockage of the wheels of the vehicle for instance, as a result of which the driver could lose control of the vehicle.

With electromechanical parking brake systems known from the prior art, an actuation of the switching element in accordance with a special control pattern is needed in order to display the vehicle state, by means of which the current vehicle state is communicated to the control device by means of the driver. For instance, after actuating the control element, the electromechanical parking brake unit is firstly slowly controlled by means of a dynamic deceleration routine, in order, if necessary, to take account of the available dynamic deceleration instance. If the control element is herewith triggered by the driver, a direct release of the parking brake usually takes place. After activating the parking brake in the dynamic operating mode, a static braking of the vehicle takes place by way of the electromechanical parking brake unit and a locking of the electromechanical parking brake takes place following a predetermined minimum actuation duration of the control element for instance.

With further electromechanical parking brake systems known from the prior art, in the event of a failure of the speed signal, the electromechanical parking brake system is operated in an emergency operation mode, wherein a dynamic brake function is exclusively provided for safety reasons only by means of the electromechanical parking brake unit. If the driver now wishes to safely stop his/her vehicle and a failure exists in the speed signal, this herewith produces a loss of comfort and safety for the driver.

SUMMARY

Based on the prior art shown, according to various embodiments, a method for controlling at least one electromechanical parking brake system can be specified, by means of which a reliable and user-friendly operation and/or control of the electromechanical parking brake is ensured, particularly in the event of the speed sensor system failing. According to an embodiment, in a method for controlling at least one electromechanical parking brake unit of a parking brake system provided in a vehicle, the current vehicle speed is detected by means of a speed sensor system in the form of a speed measuring signal and in which a deceleration measuring signal indicating the current vehicle deceleration is detected by means of at least one acceleration sensor system, with, in the event of a defective speed measuring signal or a failure of the speed sensor system, the electromechanical parking brake system being operated in an emergency operation mode, in which, at the beginning of the braking process, a dynamic brake function is provided by the electromechanical parking brake unit, wherein the current vehicle deceleration is determined from the deceleration measuring signal and is compared with a predetermined minimum deceleration value and if the determined current vehicle deceleration falls short of the pre-determined minimum deceleration value in the emergency operation mode, a static brake function is provided by the electromechanical parking brake unit.

According to a further embodiment, the dynamic brake function can also be provided by the electromechanical parking brake unit when the minimum deceleration value is exceeded. According to a further embodiment, an emergency control routine may be performed in the presence of a defective speed measuring signal or no speed measuring signal or a failure of the speed sensor system. According to a further embodiment, upon activation of the static brake function, the electromechanical parking brake unit can be activated at high speed and locked. According to a further embodiment, upon activation of the dynamic brake function, the electromechanical parking brake unit can be activated at low speed. According to a further embodiment, the minimum deceleration value can be selected as a function of the braking force generated by the electromechanical parking brake system. According to a further embodiment, the electromechanical parking brake unit can be actuated in accordance with at least one activation profile in order to generate a characteristic deceleration profile. According to a further embodiment, in accordance with a first activation profile, the generated actuator force may be kept constant section by section, so that a staircase-shaped profile course results. According to a further embodiment, in accordance with a second activation profile, the electromechanical parking brake unit is released and activated alternately. According to a further embodiment, the activation speed of the electromechanical parking brake unit is reduced with increasing actuator force until the idling of the vehicle is detected.

According to a further embodiment, an electromechanical parking brake system may comprise at least one control device and at least one electromechanical parking brake unit, in which the control device is provided with at least one speed sensor system for detecting the current vehicle speed in the form of a speed measuring signal and with at least one acceleration sensor system for detecting the current vehicle deceleration in the form of a deceleration measuring signal, with, in the event of a defective speed measuring signal or a failure of the speed sensor system, the electromechanical parking brake system being operated in an emergency operation mode wherein, at the beginning of a braking process, a dynamic brake function is provided by the electromechanical parking brake unit, wherein at least one emergency control routine for determining the current vehicle deceleration is provided in the control device from the deceleration measuring signal and for comparing the determined current vehicle deceleration with a predetermined minimum deceleration value, with if the determined current vehicle deceleration falls short of the predetermined minimum deceleration value in the emergency operation mode, a static brake function is provided by the electromechanical parking brake unit.

According to a further embodiment of the above electromechanical parking brake, a control and evaluation routine can be provided in the control device for generating a characteristic deceleration profile, by means of which the electromechanical parking brake unit is actuated in accordance with at least one activation profile. According to a further embodiment of the above electromechanical parking brake, a first activation profile is provided to generate a constant actuator force section by section and thus a staircase-shaped deceleration profile course is provided. According to a further embodiment of the above electromechanical parking brake, a second activation profile is provided for alternately releasing and activating the electromechanical parking brake unit.

BRIEF DESCRIPTION OF THE DRAWINGS

Further embodiments can be inferred from the further dependent claims. The invention is described in more detail below using an exemplary embodiment with the aid of drawings, in which;

DETAILED DESCRIPTION

According to various embodiments, the current vehicle deceleration is determined from the deceleration measuring signal and is compared with a predetermined minimum deceleration value and a static brake function is provided by the electromechanical parking brake system when the determined current vehicle deceleration falls short of the predetermined minimum deceleration value in the emergency operation mode. A static brake function is advantageously also provided by the electromechanical parking brake system in the emergency operation mode as a function of the present vehicle deceleration. In particular, also in the event of a defective speed sensor system, the method according to various embodiments ensures that the electromechanical parking brake system also operates appropriately without intervention from the driver, namely without the driver having to change the operating instructions with which he/she is familiar, i.e. without having to actuate further control elements. Both the ease of use and also safety of the overall electromechanical parking brake system is herewith increased.

Figure 1:
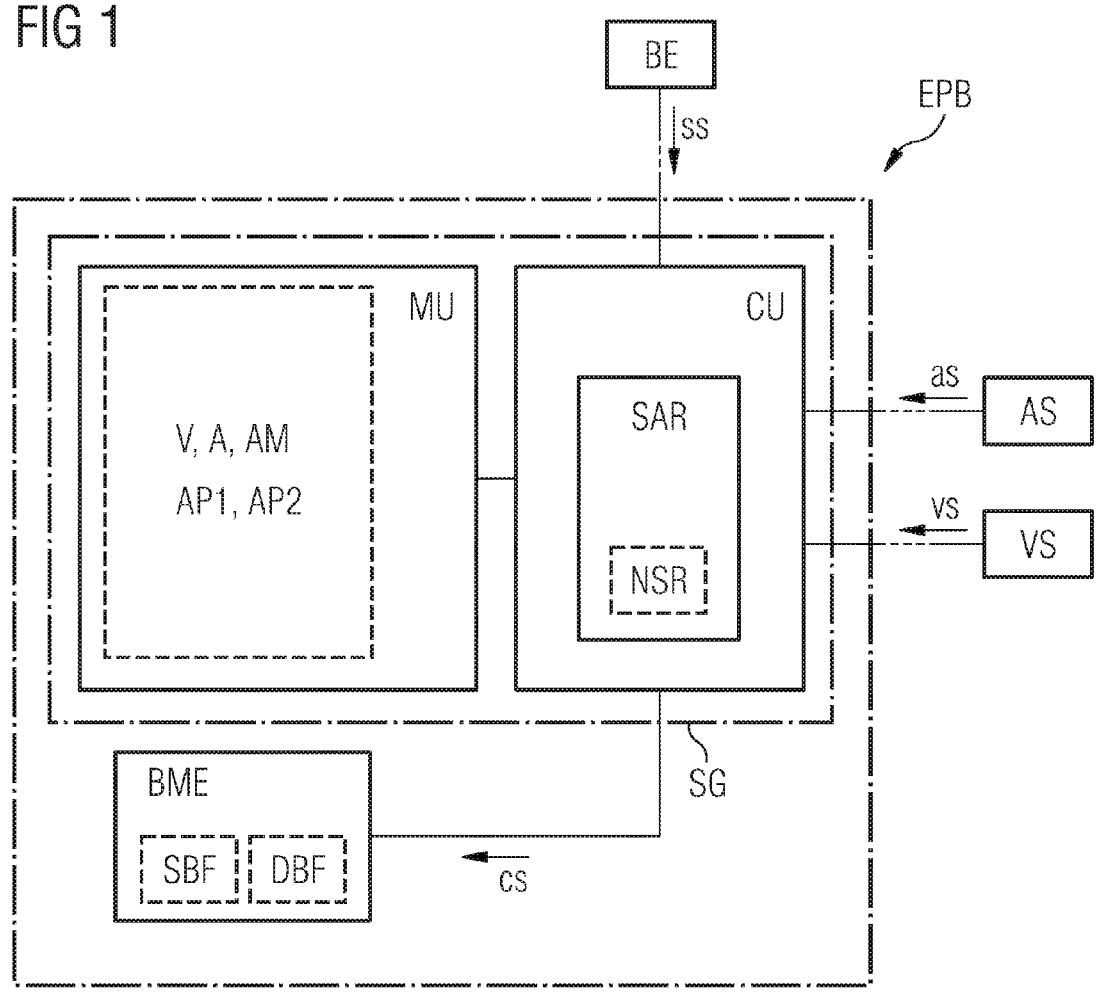
FIG. 1 shows an exemplary block diagram of an electromechanical parking brake system

FIG. 1 shows an exemplary schematic block diagram of an electromechanical parking brake system EPB with an integrated control device SG and at least one electromechanical parking brake unit BME, with the control device SG having a control unit CU and a storage unit MU connected thereto.

In an alternative embodiment, the control device SG can be arranged spatially separated from the electromechanical parking brake unit BME or can be integrated in a further vehicle control device (not shown in FIG. 1).

To manually actuate the electromechanical parking brake unit BME by means of the driver, at least one control element BE is provided, which is embodied for instance as an electronic switching unit. The control element BE is either connected directly or indirectly to the control device SG.

By actuating the control element BE, an electrical switching signal ss is preferably generated, which is transmitted to the control device SG and/or the control unit CU. With the aid of a control and evaluation routine SAR configured in the control unit CU, the electrical switching signal ss is evaluated and the actuation of the control element BE and the actuation duration and/or actuation pattern thereof is thus determined.

The electromechanical parking brake unit BME is also connected directly or indirectly to the control unit CU. As a function of the evaluation of the switching signal ss by the control and evaluation unit SAR, this generates a control signal cs provided to control the electromechanical parking brake unit BME and transmits it from the control unit CU to the electromechanical parking brake unit BME. As a function of the control signal cs, the electromechanical parking brake unit BME provides a static or dynamic brake function SBF, DBF.

The control device SG is connected directly or indirectly to at least one speed sensor system VS, by way of which at least the current vehicle speed V is detected and is transmitted to the control device SG in the form of a speed measuring signal vs. At least one acceleration sensor system AS is also provided in the vehicle, which likewise has a direct or indirect connection to the control device SG. Alternatively, the acceleration sensor system AS can also be integrated in the control device SG.

The acceleration sensor system AS is embodied so as to detect a deceleration measuring signal indicating the current vehicle deceleration A. An acceleration sensor system AS of this type, which is provided in particular to detect the vehicle deceleration A in the direction of travel of the vehicle is frequently already present in modern vehicle architectures, in order, namely, to provide acceleration and/or deceleration data for a driver assistance system.

Acceleration sensors are also already used in electromechanical parking brake systems EPB known from the prior art for detecting the road incline. The deceleration information thus already provided in the vehicle in the direction of travel is actively evaluated in accordance with the various embodiments in order to control the electromechanical parking brake system EPB in the emergency operation mode.

By means of the control and evaluation routine SAR, the current vehicle speed V and/or the current vehicle deceleration A in the vehicle direction is derived from the speed measuring signal vs provided and/or the deceleration measuring signal as and is if necessary buffered in the storage unit MU.

If errors now occur during the detection of the speed measuring signal (vs) or during its transmission, so that a defective speed measuring signal vs or if necessary no speed measuring signal vs is present in the control device SG, the control and evaluation unit SAR controls the electromechanical parking brake system EPB in an emergency operation mode, in which a dynamic brake function DBF is exclusively provided by the electromechanical parking brake unit BME, i.e. no static brake function SBF exists.

Figure 2:
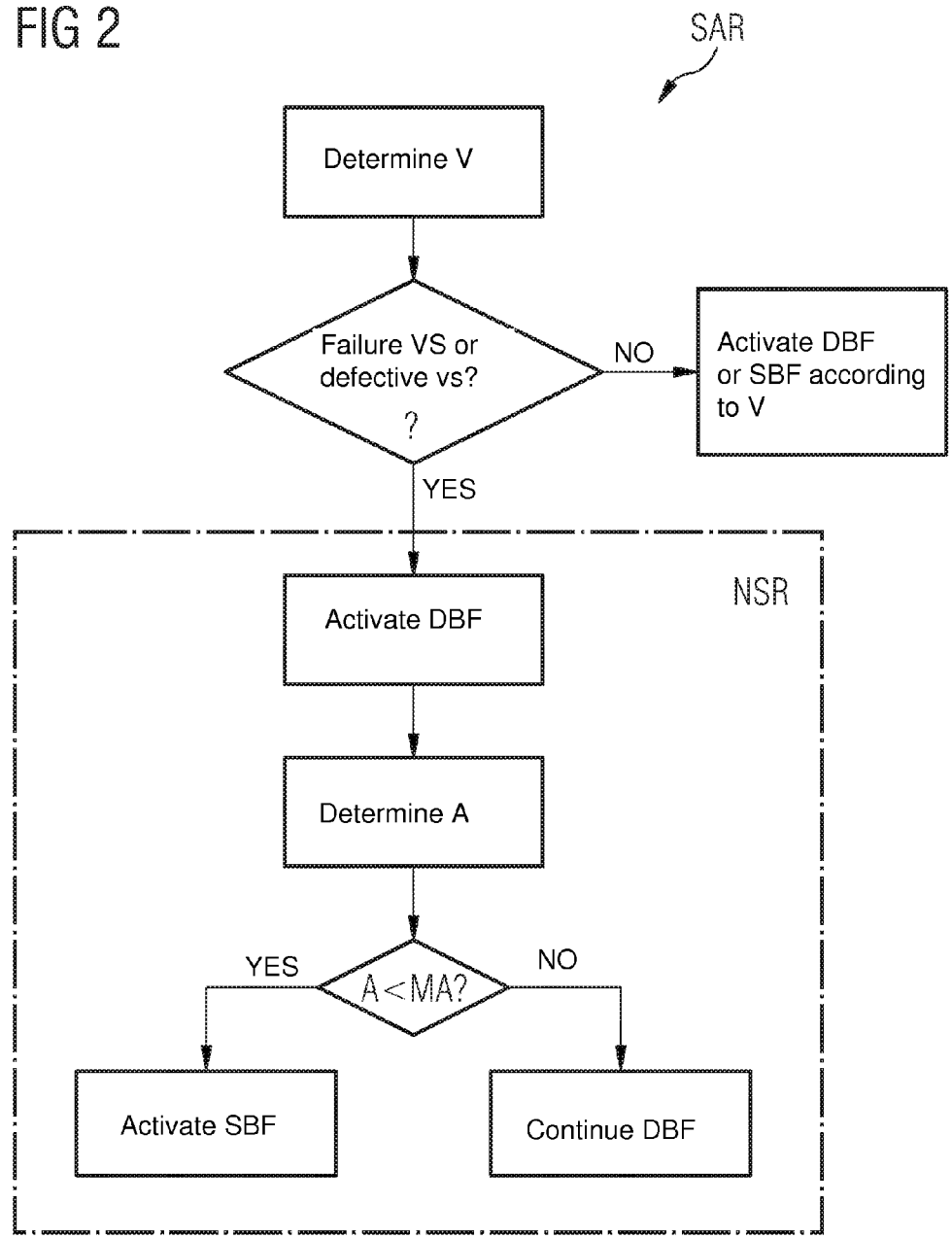
FIG. 2 shows an exemplary flow chart of a control and evaluation routine for controlling the electromechanical parking brake system according to FIG. 1

According to the flow chart shown in FIG. 2, the control and evaluation routine SAR firstly checks for the presence of a defective speed measuring signal vs or a failure of the speed sensor system VS, i.e. no existing speed measuring signal vs.

If no speed measuring signal vs or a defective speed measuring signal vs is present, the electromechanical parking brake system EPB is controlled in the emergency operation mode and a dynamic brake function DBF is initially exclusively provided by the electromechanical parking brake unit BMW. To operate the electromechanical parking brake system EPB in the emergency operation mode, an emergency control routine NSR is embodied in the control unit CU by the control and evaluation routine SAR.

If a correct speed measuring signal vs is present and/or no failure of the speed sensor system VS was detected, either the dynamic brake function DBF or the static brake function SBF is provided by the electromechanical parking brake unit BME as a function of the determined speed V.

Within the scope of the emergency control routine NSR, the current vehicle deceleration A is determined from the deceleration measuring signal as and is compared with a predefined minimum deceleration value MA and if the determined current vehicle deceleration A falls short of the predetermined minimum deceleration value MA, a static brake function SBF is provided by the electromechanical parking brake unit. To this end, the control unit CU generates a corresponding control signal cs and transmits the same to the electromechanical parking brake unit BME. Within the scope of the static brake function SBF, the electromechanical parking brake unit BME is activated at high speed for instance and is then locked. According to an embodiment, the minimum deceleration value MA can be selected as a function of the present brake force.

If the current determined vehicle deceleration A exceeds the predetermined minimum deceleration value MA, the dynamic brake function DBF is also provided by the electromechanical parking brake unit BMW, within the scope of which only an activation of the electromechanical parking brake unit BME takes place at low speed or with a predetermined activation profile AP1, AP2.

In a further embodiment, within the scope of the emergency control routine NSR, the electromechanical parking brake unit BME is actuated according to a first and second activation profile AP1, AP2, from which an associated characteristic deceleration profile results.

Figure 3:
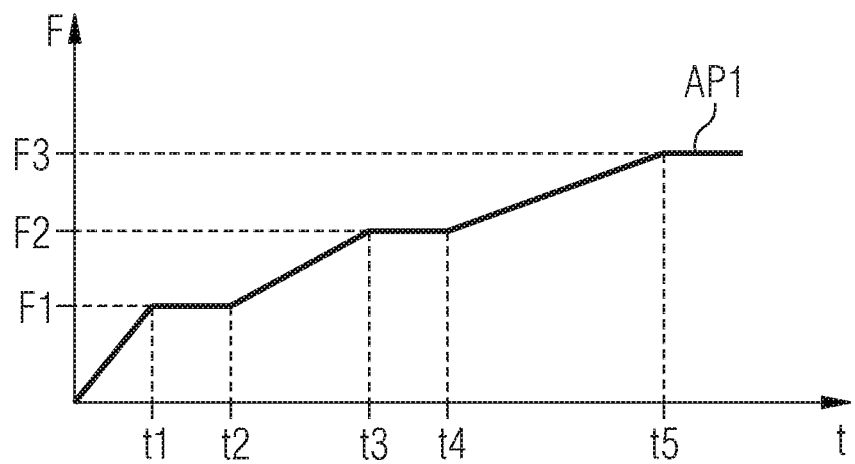
FIG. 3 shows an exemplary diagram of a characteristic curve for controlling the braking unit and FIG. 4 shows an exemplary diagram of an alternative characteristic curve for controlling the braking unit.
Figure 4:
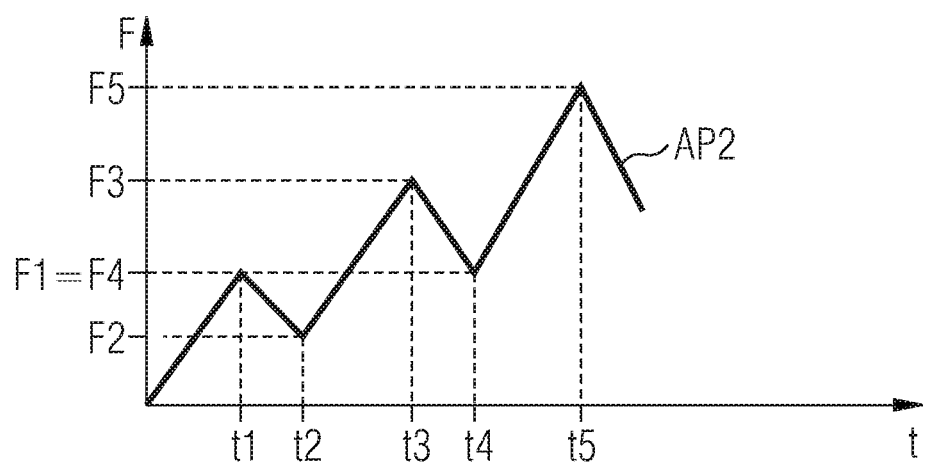

In the FIGS. 3 and 4, a first and second activation profile AP1, AP2 is shown in each instance in a diagram. The x-coordinate shows the actuation time t of the electromechanical parking brake unit BME and the y-coordinate shows the actuator force F generated in order to actuate the electromechanical parking brake unit BME.

According to the first activation profile AP1, the generated actuator force F is kept constant section by section for instance, so that a staircase-shaped profile curve results. After reaching a first actuator force F1 at a first actuation time t1, the first actuator force K1 is kept constant until a second actuation time t2. Subsequently, the first actuator force F1 increases to a second actuator force F2, namely at a third actuation time t3. The second actuator force F2 is in turn kept constant until a fourth actuation time t4 exists, and is then increased until a third actuator force F3 is reached, namely at a fifth actuation time t5.

According to the first activation profile AP1, the activation speed of the electromechanical parking brake unit BME is reduced with increasing actuator force F until the idling of the vehicle is detected. The gradual actuation of the electromechanical parking brake unit BME advantageously decelerates the vehicle jerkily, as a result of which a simple detection of the vehicle deceleration A is possible by means of the control and evaluation routine SAR.

According to the second activation profile AP2, an automatic changeover is implemented between activation and release of the electromechanical parking brake unit BME. The actuator force F is increased until a first actuator force F1 exists and the actuator force F is then reduced to a second actuator force F2. A renewed increase to a third actuator force F3 then takes place. The actuator force F is reduced again by the third actuator force F3, namely to the fourth actuator force F4, which corresponds with the first actuator force F1 in terms of amount. The actuator force F is then increased again to the fifth actuator force F5.

According to an embodiment, the first or second activation profile AP1, AP2 is selected as a function of the actuation of further vehicle control elements, for instance the brake pedal or the accelerator etc. or the road incline.

Similarly, the embodiment of the emergency control routine NSR can take place as a function of the release of the control element BE or the modulation in respect of a degraded ramp.

The invention was described above using an exemplary embodiment. It shall be understood that numerous changes and modifications are possible, without departing from the inventive concept underlying the invention.

List Of Reference Characters
A vehicle deceleration
AP1 first activation profile
AP2 second activation profile
AS acceleration sensor system
as deceleration measuring signal
BE control element
BME electromechanical parking brake unit
cs control signal
CU control unit
DBF dynamic brake function
EPB electromechanical parking brake system
F actuator force
F1-F5 first to fifth actuator force
MA minimum deceleration value
MU storage unit
NSR emergency control routine
SAR control and evaluation routine
SBF static brake function
SG control device
ss switching signal
t actuation time
t1-t5 first to fifth actuation time V vehicle speed
vs speed measuring signal
VS speed sensor system

What is claimed is:

1. A method for controlling a electromechanical parking brake unit of a parking brake system provided in a vehicle, comprising:
detecting a current vehicle speed by means of a speed sensor of a speed sensor system in the form of a speed measuring signal,
a control device of the speed sensor system checking whether the speed measuring signal is defective or not received from the speed sensor,
the control device detecting a deceleration measuring signal indicating a current vehicle deceleration by means of at least one acceleration sensor system, and, in the event of a detected defective speed measuring signal or the speed measuring signal not received from the speed sensor, operating the parking brake system in an emergency operation mode, in which, at the beginning of a braking process, a dynamic brake function is provided by the electromechanical parking brake unit, and
the control device determining the current vehicle deceleration from the deceleration measuring signal and comparing the current vehicle deceleration with a predetermined minimum deceleration value and if the determined current vehicle deceleration falls short of the pre-determined minimum deceleration value in the emergency operation mode, a static brake function is provided by the electromechanical parking brake unit.

2. The method according to claim 1, wherein the dynamic brake function is also provided by the electromechanical parking brake unit when the minimum deceleration value is exceeded.

3. The method according to claim 1, wherein an emergency control routine is performed in the presence of a defective speed measuring signal or no speed measuring signal or a failure of the speed sensor system.

4. The method according to claim 1, wherein upon activation of the static brake function, the electromechanical parking brake unit is activated at a predetermined high speed and locked.

5. The method according to claim 4, wherein upon activation of the dynamic brake function, the electromechanical parking brake unit is activated at a predetermined low speed.

6. The method according to claim 1, wherein the minimum deceleration value is selected as a function of the braking force generated by the parking brake system.

7. The method according to claim 1, wherein, in the emergency operation mode, the electromechanical parking brake unit is actuated in accordance with at least one activation profile in order to generate a characteristic deceleration profile.

8. The method according to claim 7, wherein in accordance with the at least one activation profile, the generated actuator force is kept constant section by section, so that a staircase-shaped profile course results.

9. The method according to claim 8, wherein the activation speed of the electromechanical parking brake unit is reduced with increasing actuator force until the idling of the vehicle is detected.

10. The method according to claim 7, wherein in accordance with the at least one activation profile, the electromechanical parking brake unit is released and activated alternately.

11. An electromechanical parking brake system comprising at least one control device and at least one electromechanical parking brake unit, in which the at least control device is provided with at least one speed sensor system including at least one speed sensor for detecting a current vehicle speed in the form of a speed measuring signal and with at least one acceleration sensor system for detecting a current vehicle deceleration in the form of a deceleration measuring signal,
the at least one control device of the speed sensor system configured to check whether the speed measuring signal is defective or not received from the at least one speed sensor, and in the event of a defective speed measuring signal or the speed measuring signal not received from the at least one speed sensor, the electromechanical parking brake system being operated in an emergency operation mode wherein, at the beginning of a braking process, a dynamic brake function is provided by the at least one electromechanical parking brake unit,
the at least one control device including at least one emergency control routine for determining the current vehicle deceleration from the deceleration measuring signal and for comparing the determined current vehicle deceleration with a predetermined minimum deceleration value, wherein if the determined current vehicle deceleration falls short of the predetermined minimum deceleration value in the emergency operation mode, a static brake function is provided by the at least one electromechanical parking brake unit.

12. The electromechanical parking brake system according to claim 11, wherein the at least one emergency control routine actuates the electromechanical at least one parking brake unit in accordance with at least one activation profile.

13. The electromechanical parking brake system according to claim 12, wherein the at least one activation profile is provided to generate a constant actuator force section by section and thus a staircase-shaped deceleration profile course is provided.

14. The electromechanical parking brake system according to claim 12, wherein the at least one activation profile is provided for alternately releasing and activating the electromechanical parking brake unit.

15. A system for controlling at least one electromechanical parking brake unit of a parking brake system provided in a vehicle comprising:
a speed sensor system detecting a current vehicle speed in the form of a speed measuring signal and
at least one acceleration sensor system detecting a deceleration measuring signal indicating a current vehicle deceleration,
at least one control device configured to:
check whether the speed measuring signal is defective or not received from the speed sensor system,
in the event of a detected defective speed measuring signal or the speed measuring signal not being received from the speed sensor system, to operate the parking brake system in an emergency operation mode, in which, at the beginning of the braking process, a dynamic brake function is provided by the at least one electromechanical parking brake unit, and
to determine the current vehicle deceleration from the deceleration measuring signal and to compare the deceleration measuring signal with a predetermined minimum deceleration value and if the determined current vehicle deceleration falls short of the predetermined minimum deceleration value in the emergency operation mode, the at least one electromechanical parking brake unit is operable to provide a static brake function.

16. The system according to claim 15, wherein the dynamic brake function is also provided by the at least one electromechanical parking brake unit when the minimum deceleration value is exceeded.

17. The system according to claim 15, wherein an emergency control routine is performed in the presence of a defective speed measuring signal or no speed measuring signal or a failure of the speed sensor system.

18. The system according to claim 15, wherein upon activation of the static brake function, the at least one electromechanical parking brake unit is activated at a predetermined high speed and locked.

19. The system according to claim 18, wherein upon activation of the dynamic brake function, the at least one electromechanical parking brake unit is activated at a predetermined low speed.

20. The system according to claim 15, wherein the minimum deceleration value is selected as a function of the braking force generated by the parking brake system.

* * * * *